United States Patent Office 3,558,503
Patented Jan. 26, 1971

3,558,503
STABLE BROMO-SULFAMATE COMPOSITION
Robert D. Goodenough and John Place, Midland, Mich., and Christ F. Parks, Tulsa, Okla., assignors to The Dow Chemical Company, Midland, Mich., a corporation of Delaware
No Drawing. Filed July 22, 1968, Ser. No. 746,275
Int. Cl. C01b 11/20; C09k 3/00
U.S. Cl. 252—187
12 Claims

ABSTRACT OF THE DISCLOSURE

The present disclosure relates to novel bromine solutions and to a process for producing said solutions which comprises treating aqueous solutions of bromine with a nitrogen-containing bromine stabilizer and an alkali metal or alkaline earth hydroxide at controlled pH levels. The resulting solutions are relatively non-corrosive and substantially resistant to degradation and/or decomposition of the bromine values contained therein. The solutions also retain an acceptable capacity for oxidation and bactericidal activity.

BACKGROUND OF THE INVENTION

Aqueous solutions of bromine are widely used in bleaching processes, treatment of swimming pool water, and as disinfectants. As is well known in the art, upon addition to water, bromine forms a solution containing both the bromide ion ($Br^-$) and the hypobromite ion ($BrO^-$). Therefore, in referring to bromine solutions herein the reference is meant to indicate the resulting solutions formed by the addition of bromine to water which can also contain both the bromide and hypobromite ions along with free bromine. The active oxidizer species therefore includes HOBr, $BrO^-$ or $Br_2$ and will be identified hereinafter as bromine values. Bromine solutions which can be treated by the present process are those wherein the bromine value comprises from about 0.01 to about 100,000 parts per million (p.p.m.) by weight of the solution. The bromine values in these solutions, however, are susceptible to decomposition during storage and prior to use and the solutions lose their beneficial properties. Additionally, prior to any detrimental oxidation, aqueous solutions of bromine have a very corrosive action when contacted with metals and other non-corrosion resistant materials.

It is an object of the present invention to provide a process whereby aqueous solutions of bromine can be produced which are relatively resistant to degradation and/or decomposition and which are relatively non-corrosive, yet which retain an acceptable capacity for oxidation and bactericidal activity.

It is another object of the present invention to provide stable, relatively non-corrosive aqueous solutions of bromine values which exhibit an acceptable capacity for oxidation and bactericidal activity.

Other objects and advantages of the present invention will become obvious from the following description thereof.

SUMMARY OF THE INVENTION

The novel aqueous bromine solutions of the present invention comprise from about 0.01 to about 100,000 p.p.m. by weight of bromine values. The solution also comprises a sufficient amount of bromine stabilizer so that the molar ratio of bromine to nitrogen in the stabilizer (Br/N) ranges from about 2 to about 0.5. The solution is further characterized by the presence of a sufficient amount of hydroxide additive to achieve a pH ranging from about 8 to about 10.

The process of the present invention comprises providing an aqueous solution of bromine and contacting therewith either successively or simultaneously a bromine value stabilizer, and an amount of a hydroxide additive sufficient to achieve a final pH in the system ranging from about 8 to about 10.

Generally, the crux of the present invention resides in the fact that a solution of stabilized bromine stabilizer and a metal hydroxide are present together in solution. Therefore the order of addition of these reagents to water or an aqueous solution of the other reagents is not critical to operability of the invention. However, it has been found that stabilization of the bromine values is optimized if the hydroxide is added last to an aqueous solution containing the other two reagents.

Additionally, it should be understood that the bromide solutions to be treated by the process of the present invention can contain other materials prior to treatment in addition to the bromine values. As an example, brine solutions, such as sodium chloride or calcium chloride brines, containing bromine values could be treated by the process of the present invention.

In the process of the present invention enough of the nitrogen-containing bromine stabilizer is added to the solution so that the molar ratio of bromine to nitrogen present in the stabilizer ($Br_2/N$) ranges from about 2 to about 0.5.

Bromine stabilizers are members selected from the group consisting of biuret, succinimide, urea and lower aliphatic mono- and disubstituted ureas containing from about 2 to about 4 carbon atoms in each substituent group, sulfamic acid, and alkyl sulfonamides corresponding to the formula $RSO_3NH_2$ where R is a member selected from the group consisting of —$CH_3$ and —$C_2H_5$.

Generally, hydroxide additives which can be employed in the present invention are alkaline earth and alkali metal hydroxides such as, for example, lithium hydroxide, sodium hydroxide, potassium hydroxide, barium hydroxide, magnesium hydroxide, strontium hydroxide, and calcium hydroxide.

Addition of the bromine stabilizer to the aqueous bromine solution may be accomplished by any means suitable to achieve the desired proportion. For example, solid bromine stabilizer may be added directly to the aqueous solution, or the bromine-containing solution may be passed through a bed of bromine stabilizer. Also, the stabilizer may be prepared as a relatively concentrated aqueous solution and added to the aqueous bromine solution to be stabilized. The hydroxide additive could also be added to the solution in a manner substantially similar to any of the above-described methods.

PREFERRED EMBODIMENTS

A preferred embodiment of the present invention is an aqueous bromine solution wherein the concentration of bromine values in the solution ranges from about 1 to about 50,000 p.p.m. weight of the solution. The $Br_2/N$ molar ratio ranges from about 1.0 to about 1.5, and the pH ranges from about 9.0 to about 9.6. The hydroxide additive is magnesium hydroxide and the bromine stabilizer is a member selected from the group consisting of biuret, sulfamic acid, methyl sulfonamide, ethyl sulfonamide, and mixtures thereof.

A preferred embodiment of the present invention is the process described hereinabove wherein the concentration of bromine values in the bromine solution ranges from about 100 parts per million up to about 50,000 p.p.m. by weight of the solution.

The bromine stabilizer is added in sufficient quantities to achieve a $Br_2/N$ molar ratio ranging from about 1.0 to about 1.5.

After treatment, the pH of the system preferably ranges from about 9.0 to about 9.6. Preferably this pH range will be achieved by employing magnesium hydroxide.

The following examples are set forth to illustrate the present invention and are not to be construed as limitations thereof.

EXAMPLE 1

Tests were conducted to determine the corrosivity of substantially oxygen-free NaCl/CaCl$_2$ brine solutions containing bromine, and/or magnesium hydroxide. The composition of the brine solution (5% NaCl, 3% CaCl$_2$) and testing procedure employed correspond substantially to the description set out for API brine, standard corrater test, by the Magna Corp., Redwood City, Calif.

Measurements of corrosion rate and pitting index were obtained by use of a corrater wherein the prongs were composed of a carbonaceous or "mild" steel.

As a standard, the corrosivity of the oxygen-free brine solution was measured. The corrosion rate of the brine solution was about 1.2 mils yer year (m.p.y.) and the pitting index was 1.0.

The data obtained in the tests is set forth in Table I.

droxide was added to the solution to achieve a pH of about 9.6.

The so-prepared bromine solutions were inoculated with cultures of Desulfovibrio desulfuricans, a sulfate reducing bacteria. At intervals of 1, 2, 5, 10 and 15 minutes, samples of the bacteria-containing bromine solutions were extracted and subjected to the commonly employed test of the American Petroleum Institute (API) RP-38. The test involves placing the extracted bromine solutions in an API broth containing ferrous ion. At the end of one month, if the bacteria have all been killed by their brief exposure to the bromine solutions, the API broth would not contain any black ferrous sulfide which is evidence of the growth of the bacteria.

The results of these tests are set forth in Table II.

TABLE II

| Run No.: | Initial solution | Milliliter culture plus milliliter solution | Available Br (pH 4.5 titration) after inoculation p.p.m. | Growth of bacteria |
|---|---|---|---|---|
| Control | 1,820 p.p.m. bromine plus sulfamic acid | 5+25 | 1,200 | None after 1 month. |
| 1 | 1,820 p.p.m. Br$_2$ plus sulfamic acid plus Mg(OH)$_2$. | 2+20 | 1,480 | Do. |
| Control | 1,760 p.p.m. Br$_2$ plus sulfamic acid | 5+25 | 1,200 | Do. |
| 2 | 1,760 p.p.m. Br$_2$ plus sulfamic acid plus Mg(OH)$_2$. | 2+20 | 970 | Do. |

From Table II it can be seen that the solutions of bromine, stabilizer and hydroxide are effective as bactericides against D. desulfuricans bacteria.

EXAMPLE 3

Tests were conducted to determine the stability of bromine solutions containing both a stabilizer and magnesium hydroxide. Additionally, an object of the tests was to in-

TABLE I

| Run Number: | Oxygen-free NaCl/CaCl$_2$ brine system [1] | pH | Time elapsed, hours | Corrosion rate, m.p.y. | Pitting index |
|---|---|---|---|---|---|
| 1 | Oxygen-free, control | 6.8 | | 1.2 | 1.0 |
| 2 | 27½ p.p.m. Br$_2$, control | 3.0 | 0 | 12.5 | 22.0 |
| | | | 1 | 8.2 | 6.0 |
| | | | 2 | 6.8 | 4.0 |
| 3 | 27½ p.p.m. Br$_2$ plus Mg(OH)$_2$, control | 9.6 | 0 | 10.0 | 10.0 |
| | | | 1 | 8.0 | 21.0 |
| | | | 2 | 7.5 | 23.0 |
| 4 | 27½ p.p.m. Br$_2$ plus urea, control | 2.3 | 0 | 11.5 | 33.0 |
| | | | 1 | 6.8 | 18.0 |
| | | | 2 | 6.0 | 12.0 |
| 5 | 27½ p.p.m. Br$_2$ plus urea plus Mg(OH)$_2$ | 9.6 | 0 | 2.4 | 2.0 |
| | | | 1 | 2.2 | 1.0 |
| | | | 2 | 2.2 | 1.0 |
| 6 | 27½ p.p.m. Br$_2$ plus sulfamic acid, control | 1.9 | 0 | 12.0 | 16.0 |
| | | | 1 | 10.5 | 12.0 |
| | | | 2 | 8.8 | 4.0 |
| 7 | 27½ p.p.m. Br$_2$ plus sulfamic acid plus Mg(OH)$_2$ | 9.6 | 0 | 1.4 | 4.0 |
| | | | 1 | 1.2 | 2.0 |
| | | | 1½ | 1.2 | 1.0 |

[1] Nitrogen-containing compounds added in atomic ratio of 1 N:1 Br. Mg(OH)$_2$ added until excess solid present.

From Table I it can be seen that in tests 5 and 7, desirable low corrosion rates and pitting indices were obtained. In tests 2, 3, 4, and 6 i.e. the controls, where either the magnesium hydroxide or the stabilizer was missing, the corrosion rates and pitting indices showed a marked rise. This demonstrates that a combination of the hydroxide and bromine stabilizer must be employed if the corrosivity of the bromine solution is to be reduced.

EXAMPLE 2

In order to demonstrate the effectiveness as a bactericide of a bromine solution containing a bromine stabilizer and magnesium hydroxide, solutions of bromine, sulfamic acid, and the hydroxide were prepared wherein the Br$_2$/N ratio was about 1. Enough magnesium hyvestigate whether the order of combination of the reagents produced an effect upon stability of the bromine values. In all cases, the determination of the amount of bromide and hypobromite present was determined by commonly employed electrometric titration at a pH of about 4.5.

Solution A was prepared by admixing about 6.05 grams of sulfamic acid with about 500 grams of water, followed by addition of about 3.65 grams of magnesium hydroxide and about 5 grams of bromine. Solution B was prepared by combining substantially identical amounts of the reagents employed in solution A. However in solution B, the magnesium hydroxide was added last.

Immediately following preparation, the concentration of bromine values in each solution was about 10,000 p.p.m.

The solutions were placed in brown ultraviolet light-screening bottles for about 4 days. At the end of this time, solution A contained about 7900 p.p.m. of bromine values, and solution B contained about 8120 p.p.m. of bromine values.

After two weeks, solution A contained about 7740 p.p.m. of bromine values and solution B contained about 8080 p.p.m. of bromine values.

Both solutions exhibited excellent stability. Additionally, solution B retained a slightly higher percentage of oxidizing bromine-values than did solution A. Therefore it is preferable to add the hydroxide last as was done in preparing solution B rather than to add the hydroxide before adding the bromine as was done in preparing solution A.

Various modifications can be made in the present invention without departing from the spirit or scope thereof, for it is understood that we limit ourselves only as defined in the appended claims.

We claim:

1. An aqueous bromine solution comprising from about 0.01 to about 100,000 parts per million by weight of bromine values wherein the molar ratio of bromine to nitrogen present in the bromine stabilizer ranges from about 2.0 to 1 to about 0.5 to 1, and said stabilizer is a member selected from the group consisting of biuret, succinimide, urea and lower aliphatic mono- and disubstituted ureas containing from about 2 to about 4 carbon atoms in each substituent group, sulfamic acid, and alkyl sulfonamides corresponding to the formula $RSO_3NH_2$ where R is a member selected from the group consisting of $-CH_3$ and $-C_2H_5$, said solution being further characterized by the presence of sufficient hydroxide additive to provide a pH in the solution ranging from about 8 to about 10, said hydroxide additive being a member selected from the group consisting of alkaline earth hydroxides and alkali metal hydroxides.

2. The solution defined in claim 1 wherein the concentration of bromine values ranges from about 1 to about 50,000 parts per million by weight of the solution.

3. The solution defined in claim 1 wherein the molar ratio of bromine to nitrogen present in the stabilizer ranges from about 2 to about 0.5, and the stabilizer is a member selected from the group consisting of biuret, sulfamic acid, methyl sulfonamide, ethyl sulfonamide, and mixtures thereof.

4. The solution defined in claim 1 wherein the pH ranges from about 9.0 to about 9.6, and wherein the hydroxide additive is magnesium hydroxide.

5. A process for stabilizing and reducing the corrosivity of bromine solutions which comprises providing a bromine solution wherein from about 0.01 to about 100,000 parts per million by weight of the solution is bromine values, and contacting said solution with a nitrogen containing bromine stabilizer and an amount of hydroxide additive sufficient to provide a pH in the final solution ranging from about 8 to about 10.

6. The process defined in claim 5 wherein the bromine solution is contacted simultaneously with the bromine stabilizer and the hydroxide.

7. The process defined in claim 5 wherein the bromine solution is contacted successively by the bromine stabilizer and the hydroxide.

8. The process defined in claim 5 wherein the bromine stabilizer is a member selected from the group consisting of biuret, succinimide, urea, lower aliphatic mono- and disubstituted ureas containing from about 2 to 4 carbon atoms in each substituent group, sulfamic acid, and alkyl sulfamates corresponding to the structural formula $$RSO_3NH_2$$

where R is a member selected from the group consisting of methyl, and ethyl.

9. The process defined in claim 5 wherein the hydroxide additive is a member selected from the group consisting of alkaline earth hydroxides and alkali metal hydroxides.

10. The process defined in claim 5 wherein the bromine stabilizer is a member selected from the group consisting of biuret, sulfamic acid, methyl sulfonamide, ethyl sulfonamide, and mixtures thereof.

11. The process defined in claim 5 wherein the molar ratio of bromine to nitrogen present in said stabilizer ranges from about 2.0 to about 0.5.

12. The process defined in claim 5 wherein the hydroxide additive is magnesium hydroxide.

References Cited

UNITED STATES PATENTS

| | | | |
|---|---|---|---|
| 3,085,854 | 4/1963 | Meybeck et al. | 23—85 |
| 3,095,267 | 6/1963 | Kircher et al | 23—85 |

RICHARD D. LOVERING, Primary Examiner

I. GLUCK, Assistant Examiner

U.S. Cl. X.R.

21—58; 23—85, 216; 210—62; 252—401, 405; 424—127